United States Patent [19]
Bauver et al.

[11] Patent Number: 5,946,901
[45] Date of Patent: Sep. 7, 1999

[54] METHOD AND APPARATUS FOR IMPROVING GAS FLOW IN HEAT RECOVERY STEAM GENERATORS

[75] Inventors: Wesley P. Bauver, Granville, Mass.; Paul F. Miller, Ellington, Conn.

[73] Assignee: Combustion Engineering, Inc., Windsor, Conn.

[21] Appl. No.: 08/992,936

[22] Filed: Dec. 17, 1997

[51] Int. Cl.[6] ...................................................... F02C 6/00
[52] U.S. Cl. ..................... 60/39.182; 60/39.5; 122/7 R
[58] Field of Search ............................... 60/39.182, 39.5; 122/7 R, 7 B

[56] References Cited

U.S. PATENT DOCUMENTS

| 4,106,286 | 8/1978 | Sakai et al. ........................... 60/39.182 |
| 4,466,241 | 8/1984 | Inui et al. ............................. 60/39.182 |
| 5,431,009 | 7/1995 | Bauver, II ............................ 60/39.182 |
| 5,461,853 | 10/1995 | Vetterick ........................... 60/39.182 X |
| 5,467,591 | 11/1995 | Bozzuto et al. .................. 60/39.182 X |
| 5,555,718 | 9/1996 | Anderson et al. ............... 60/39.182 X |

*Primary Examiner*—Hoang Nguyen
*Attorney, Agent, or Firm*—Alix, Yale & Ristas, LLP

[57] ABSTRACT

A heat recovery steam generator has a housing defining a horizontally oriented exhaust gas stream path from a gas turbine. The housing has a diffuser portion and a full cross-section portion containing heat recovery assemblies. The diffuser portion expands the exhaust gas stream from the duct at the gas turbine exhaust to the full cross-section portion. Positioned in the diffuser is a diffuser heat recovery assembly for heat recovery and control of the flow distribution of the exhaust gas flow stream.

4 Claims, 3 Drawing Sheets

METHOD AND APPARATUS FOR IMPROVING GAS FLOW IN HEAT RECOVERY STEAM GENERATORS

FIELD OF THE INVENTION

This invention relates to the field of combined cycle systems having a gas turbine and a heat recovery steam generator. More particularly, this invention relates to the flow distribution of the exhaust gas stream in a heat recovery steam generator.

BACKGROUND OF THE INVENTION

Gas turbines are widely used to provide standby or supplemental peak power for electric utilities. Gas turbines are preferred for these uses because of their rapid starting capability and low capital cost. The thermal efficiency of a conventional gas turbine by itself, however, is typically low due to the high temperature of the exhaust gas. The gas turbine can be combined with a heat recovery steam generator to recover exhaust heat and therefore improve the overall thermal efficiency of the combined cycle system. The heat recovery steam generator can be employed to run a steam turbine or to provide process steam. The combination of the gas turbine and the heat recovery steam generator results in a system referred to typically as a combined cycle system.

The heat recovery steam generator is positioned downstream in the exhaust gas direction from the gas turbine. In one form of heat recovery steam generator, the housing defines a generally horizontal exhaust gas flow path. The cross-sectional area of the gas turbine exhaust is typically small in comparison to the full cross-section of the main body of the heat recovery steam generator. Therefore, the housing of the heat recovery steam generator typically has an inlet transition or diffuser portion connecting the duct, at the outlet of the gas turbine, to the main portion or full cross-section portion of the heat recovery steam generator. Heat recovery assemblies, typically including reheaters, superheaters, evaporators, economizers and feedwater heaters, are positioned in the full cross-section portion of the housing for the recovery of thermal energy from the exhaust gas stream. Furthermore, pollution control assemblies are positioned in the full cross-section portion of the housing for exhaust emission reduction. A supplementary firing system, typically a duct burner, can be located in the diffuser portion of the housing to consume excess air in the exhaust gas stream and therefore increase steam output from the heat recovery steam generator.

The expansion angle of the diffuser portion is typically 30° or greater due to space and cost constraints. As a result of the rapid expansion of the exhaust gas stream in the diffuser portion of the housing, the exhaust gas stream can undergo flow separation. This flow separation results in a non-uniform flow distribution of the exhaust gas stream entering the full cross-section portion of the heat recovery steam generator. The non-uniform flow distribution degrades performance of the duct burners and the pollution control devices of the heat recovery steam generator. Furthermore, the efficiency of heat recovery in the heat recovery steam generator itself can be reduced to unacceptable levels due to poor flow distribution of the exhaust gas stream. In addition, non-uniform flow distribution of the exhaust gas stream in the diffuser portion of the housing can increase the system pressure drop and therefore reduce the overall efficiency of the combined cycle system.

SUMMARY OF THE INVENTION

Briefly stated, a method and apparatus in accordance with the invention for improving exhaust gas flow distribution in a horizontal exhaust gas flow heat recovery steam generator has a diffuser heat recovery assembly positioned vertically upright in the diffuser portion of the housing between the exhaust of the gas turbine and the full cross-section portion of the housing. The diffuser heat recovery assembly serves two functions; it controls the flow distribution of the exhaust gas stream and recovers thermal energy.

The diffuser heat recovery assembly is generally vertically oriented and extends transversely across the diffuser portion of the housing. The diffuser heat recovery assembly in the diffuser portion of the housing can comprise conventional superheaters, reheaters, evaporators, economizers or feedwater heaters. The orientation of the heat transfer tubes forming the diffuser heat recovery assembly can be vertical, horizontal or at an angle therebetween.

In one preferred form of the invention, the diffuser heat transfer surface spans only a portion of the duct where there is greater than average flow of the exhaust gas stream in the direction from the gas turbine to the full cross-sectional portion of housing. The upper edge of the diffuser heat recovery assembly and the upper wall of the diffuser portion of the housing preferably define an open space therebetween for unobstructed flow of the exhaust gas stream from the gas turbine. The heat transfer surface of the heat transfer assembly provides resistance to exhaust gas flow and therefore causes the exhaust gas stream to be redistributed before encountering subsequent heat transfer assemblies or pollution control assemblies. The diffuser heat transfer assembly is exposed to high velocity flow from the exhaust gas stream, and therefore, has high effectiveness. Standard flow controls previously used can be reduced or eliminated from the diffuser portion of the heat recovery steam generator by employment of the diffuser heat recovery assembly, therefore resulting in cost reductions for the combined cycle system.

In further embodiments of the invention, the diffuser heat recovery assembly comprises multiple rows of diffuser heat transfer elements of various heights positioned in the diffuser portion of the housing. In a still further embodiment, the diffuser heat recovery assembly comprises horizontally oriented heat transfer tubes arranged across the diffuser portion of the housing in a descending angled arrangement for flow redistribution of the exhaust gas stream and effective recovery of energy from the heated exhaust gas stream.

DESCRIPTION OF THE PREFERRED EMBODIMENTS

Figure 1:
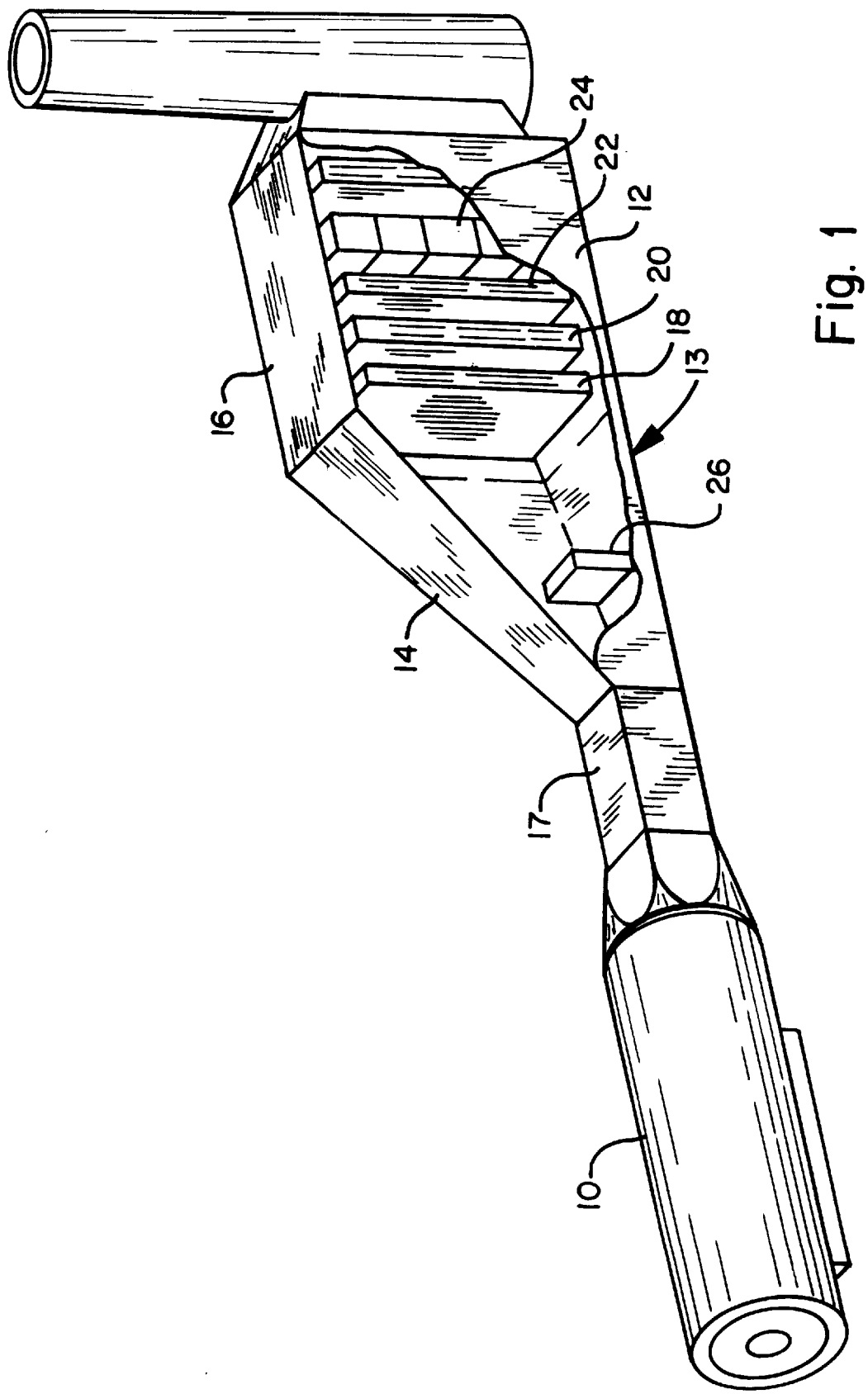
FIG. 1 is a perspective view, partially broken away, of a combined cycle system comprising a gas turbine and a heat recovery steam generator in accordance with the invention.

FIG. 1 is a perspective view of a conventional gas turbine 10 having an exhaust gas stream discharging into a heat recovery steam generator 12 in accordance with the invention. The exit gas temperatures of the exhaust gas stream of the gas turbine 10 are typically in the range of 400–600° C. Therefore, substantial thermal energy is contained in the exhaust gas stream that can be recovered to generate steam and thereby drive an electric generator (not shown) via a steam turbine (not shown), or for process steam. A duct 17 directs the exhaust gas stream from the gas turbine 10 to the heat recovery steam generator 12. The heat recovery steam generator 12 has a housing 13 defining a diffuser portion 14 and a full cross-section portion 16. The housing 13 defines a generally horizontal exhaust gas path for the exhaust gas stream to pass therethrough.

The exhaust gas stream from the gas turbine 10 expands in the diffuser portion 14 from a reduced cross-sectional area adjacent the outlet of the duct 17 to an enlarged cross-sectional area adjacent the full cross-section portion 16 of the housing 13. The full cross-section portion 16 of the heat recovery steam generator 12 typically contains multiple heat recovery assemblies 18, 20, 22 and air pollution reduction assemblies 24. These multiple heat recovery assemblies 18, 20, 22 include, by way of example, superheater assemblies, evaporative assemblies, economizer assemblies and feedwater preheating assemblies. Furthermore, the air pollution control assemblies 24 typically contain catalysts for the reduction of CO and/or the reduction of $NO_x$ and can be of well known conventional forms.

The heat recovery steam generator 12 has a diffuser heat recovery assembly 26 positioned vertically upright within the diffuser portion 14 of the housing 12. The diffuser heat recovery assembly 26 can readily include well known conventional heat transfer assemblies, for example, superheater assemblies, reheater assemblies, evaporator assemblies, economizer assemblies and/or feedwater heater assemblies. The heat transfer tubes of these assemblies can have vertical, horizontal or angled orientations. The exhaust gas is cooled by the heat recovery assembly 26. The diffuser heat recovery assembly 26 is preferably oriented across the housing 12, or perpendicular to the exhaust gas stream.

Figure 5:
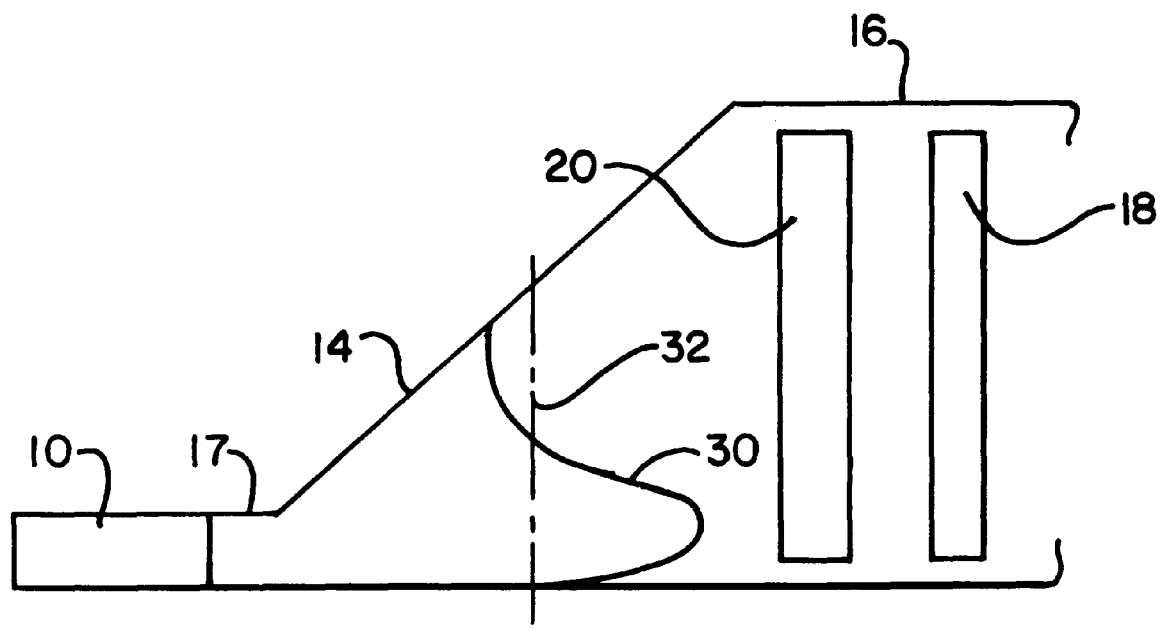
FIG. 5 is a diagram illustrating the exhaust gas flow profile within a conventional combined cycle system without any flow distribution means in the diffuser portion of the housing.
Figure 2:
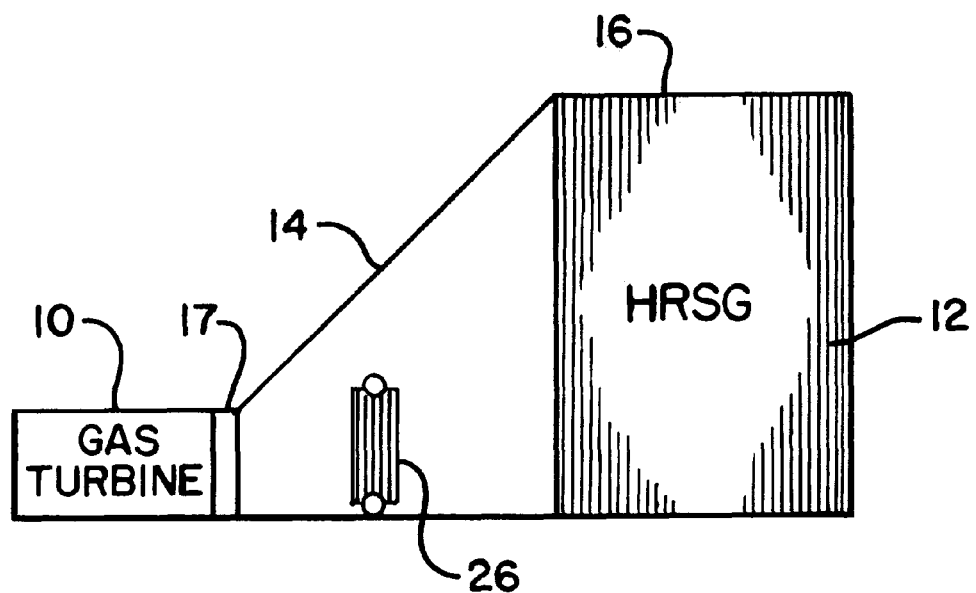
FIG. 2 is a diagrammatic side sectional view of the gas turbine and heat recovery steam generator of FIG. 1.

With reference to FIG. 5, a diagrammatic representation of the cross-sectional flow profile 30 of a conventional heat recovery steam generator 28 without any flow distribution means is demonstrated. The representative flow profile 30 indicates the greatest flow of the exhaust gas stream is in the lower portion of the housing 13 relative to an average flow 32. The diffuser heat recovery assembly 26 is positioned in the area of the greatest flow. The diffuser heat recovery assembly 26 preferably spans only the vertical portion of the diffuser portion 14 where there is greater than the average flow 32 of the exhaust gas stream from the gas turbine 10 to the full cross-sectional portion 16 of the housing 13. The exhaust flow is thereby of a more even distribution when entering the full cross-sectional portion 16 of the housing 13. The diffuser heat recovery assembly 26 improves the distribution of the flow of the exhaust gas stream, thereby improving the operation of the heat recovery steam generator 12 with regard to duct burners, pollution control devices, heat recovery and/or gas back pressure.

Figure 3:
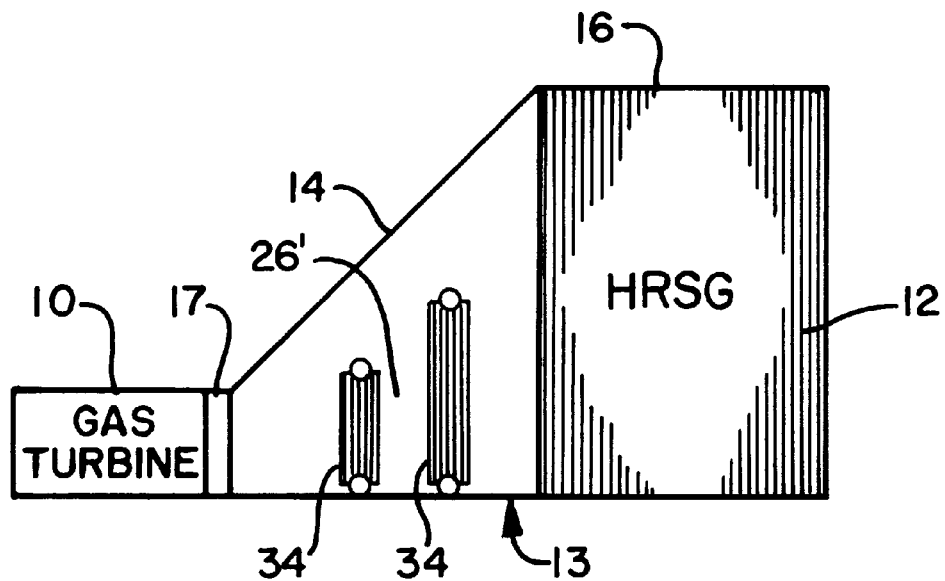
FIG. 3 is a diagrammatic side sectional view of the gas turbine and an alternate embodiment of the heat recovery steam generator of the invention.
Figure 4:
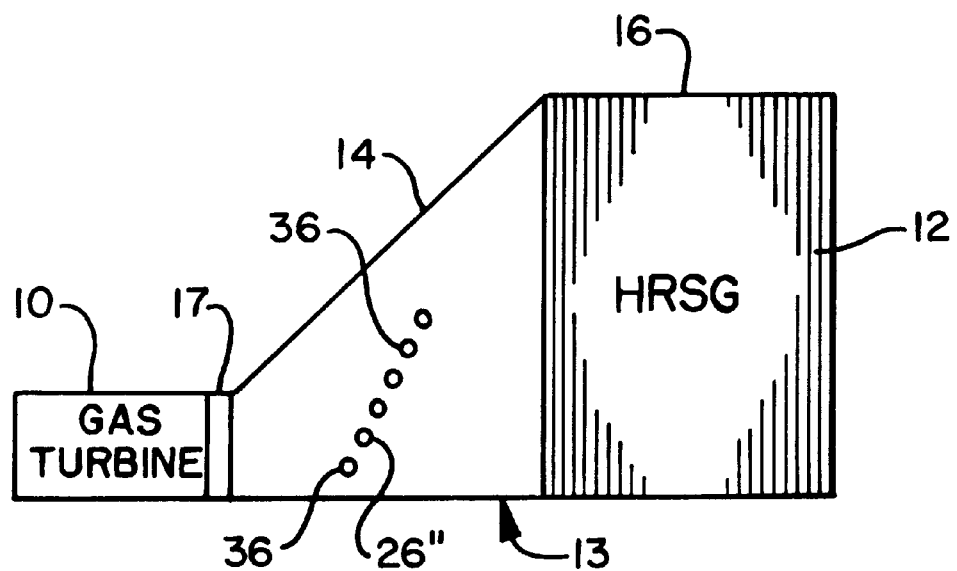
FIG. 4 is a diagrammatic side sectional view of the gas turbine in combination with a further embodiment of the heat recovery steam generator in accordance with the invention.

An alternative diffuser heat transfer assembly 26' in accordance with the invention comprises multiple spaced apart heat transfer assemblies 34 positioned within the diffuser portion 14 of the housing 13. (See FIG. 3.) The heat transfer assemblies 34 are vertically upright and arranged in rows across the exhaust gas stream. A further diffuser heat recovery assembly 26" in accordance with the invention can comprise horizontal heat transfer tubes 36 forming a descending angled arrangement from the full cross-section portion 16 of the housing 13 to the duct 17. (See FIG. 4.)

While preferred embodiments of the present invention have been illustrated and described in detail, it should be readily appreciated that many modifications and changes thereto are within the ability of those of ordinary skill in the art. Therefore, the appended claims are intended to cover any and all of such modifications which fall within the true spirit and scope of the invention.

What is claimed is:

1. A heat recovery steam generator for a combined cycle power plant comprising:

a gas turbine for generating an exhaust gas stream;

a housing defining an exhaust gas flow path from said gas turbine, said housing including a diffuser portion and a full cross-section portion, said diffuser portion expanding from a reduced cross-sectional area diffuser inlet adjacent said gas turbine to an enlarged cross-sectional area diffuser outlet adjacent said full cross section portion; and a heat recovery assembly in said diffuser portion between said diffuser inlet and said diffuser outlet for the transfer of heat from said exhaust gas stream to a heat transfer medium in said heat recovery assembly, said heat recovery assembly being located in said diffuser portion to control the distribution of the flow of said exhaust gas stream over the enlarged cross-sectional area of said diffuser outlet.

2. The heat recovery steam generator of claim 1 wherein said heat recovery assembly comprises multiple spaced apart heat transfer elements.

3. The heat recovery steam generator of claim 1 comprising a plurality of horizontally oriented heat transfer tubes.

4. The heat recovery steam generator of claim 1 wherein said diffuser portion has a lower portion extending horizontally from said gas turbine and from said diffuser inlet to a lower part of said diffuser outlet and an upper portion extending upwardly from the top of said diffuser inlet to an upper part of said diffuser outlet, said diffuser heat recovery assembly positioned primarily in said lower portion and defining a flow obstruction in said lower portion and creating an unobstructed flow path in said upper portion.

* * * * *